US012755252B2

(12) United States Patent
Peng et al.

(10) Patent No.: US 12,755,252 B2
(45) Date of Patent: Oct. 6, 2026

(54) STATE PREDICTION METHOD FOR STACKER, ELECTRONIC DEVICE AND STORAGE MEDIUM

(71) Applicants: ZHEJIANG HENGYI PETROCHEMICAL CO., LTD., Hangzhou (CN); TAICANG YIFENG CHEMICAL FIBER CO., LTD., Suzhou (CN)

(72) Inventors: Xiantao Peng, Hangzhou (CN); Peng Wang, Hangzhou (CN); Yibo Qiu, Hangzhou (CN); Mingyi Liu, Hangzhou (CN); Dake Li, Hangzhou (CN); Feng Xu, Hangzhou (CN); Jun Shen, Hangzhou (CN)

(73) Assignees: ZHEJIANG HENGYI PETROCHEMICAL CO., LTD., Zhejiang (CN); TAICANG YIFENG CHEMICAL FIBER CO., LTD., Taicang City (CN)

( * ) Notice: Subject to any disclaimer, the term of this patent is extended or adjusted under 35 U.S.C. 154(b) by 11 days.

(21) Appl. No.: 18/807,139

(22) Filed: Aug. 16, 2024

(65) Prior Publication Data

US 2025/0200530 A1 Jun. 19, 2025

(30) Foreign Application Priority Data

Dec. 13, 2023 (CN) ........................ 202311720698.X

(51) Int. Cl.
*G06Q 10/20* (2023.01)
*G06Q 10/0631* (2023.01)

(52) U.S. Cl.
CPC ..... *G06Q 10/20* (2013.01); *G06Q 10/063112* (2013.01); *G06Q 10/06316* (2013.01)

(58) Field of Classification Search
CPC ........... G06Q 10/20; G06Q 10/063112; G06Q 10/06316
See application file for complete search history.

(56) References Cited

U.S. PATENT DOCUMENTS

2011/0208567 A9 8/2011 Roddy et al.
2016/0364674 A1* 12/2016 Macatangay .. G06Q 10/063112
(Continued)

FOREIGN PATENT DOCUMENTS

CN 108415405 A 8/2018
CN 111210092 A 5/2020
(Continued)

OTHER PUBLICATIONS

Extended European Search Report dated Jan. 14, 2025 in European Patent Application No. 24195035.1.
(Continued)

*Primary Examiner* — George Chen
*Assistant Examiner* — Duane N. Moore
(74) *Attorney, Agent, or Firm* — Perilla Knox Hildebrandt Staley & Amy LLP

(57) ABSTRACT

Provided is a state prediction method for a stacker, an electronic device and a storage medium, relating to the field of chemical fiber intelligent technology. The method includes: obtaining historical work data and historical maintenance data of the stacker; obtaining a work task of the stacker within a preset time period; predicting a state of the stacker during execution of the work task based on the historical work data and the historical maintenance data; simulating the execution of the work task by the stacker within the preset time period based on the historical work data, to obtain a simulation execution result of the stacker; and generating a state prediction result of the stacker based on the time when the stacker fails and the stop position of the (Continued)

stacker when failing in combination with the simulation execution result.

15 Claims, 4 Drawing Sheets

(56) References Cited

U.S. PATENT DOCUMENTS

| | | | | |
|---|---|---|---|---|
| 2019/0287014 | A1* | 9/2019 | Spiro | G05B 23/0221 |
| 2022/0383674 | A1* | 12/2022 | Elebring | G07C 5/0841 |
| 2023/0222454 | A1* | 7/2023 | Cella | B25J 9/1682<br>705/28 |

FOREIGN PATENT DOCUMENTS

| | | | |
|---|---|---|---|
| CN | 111626498 | A | 9/2020 |
| CN | 112465244 | A | 3/2021 |
| CN | 116880401 | A | 10/2023 |
| JP | 2009143671 | A | 7/2009 |
| JP | 2018014092 | A | 1/2018 |
| WO | 2022142223 | A1 | 7/2022 |
| WO | 2022267879 | A1 | 12/2022 |

OTHER PUBLICATIONS

Japanese Notice of Allowance dated Feb. 7, 2025 in Japanese Patent Application No. 2024-213345.

Chinese First Office Action dated Oct. 24, 2025 in Chinese Patent Application No. 202311720698.X.

* cited by examiner

STATE PREDICTION METHOD FOR STACKER, ELECTRONIC DEVICE AND STORAGE MEDIUM

CROSS-REFERENCE TO RELATED APPLICATIONS

The present application claims priority to Chinese Patent Application No. CN202311720698.X, filed with the China National Intellectual Property Administration on Dec. 13, 2023, the disclosure of which is hereby incorporated herein by reference in its entirety.

TECHNICAL FIELD

The present disclosure relates to the field of chemical fiber intelligent technology, and in particular to a state prediction method and apparatus for a stacker.

BACKGROUND

In the field of chemical fiber production, the stackers are widely used in the automated stereoscopic warehouses as a type of storage equipment. As one of the important logistics devices in the automated stereoscopic warehouses, the stackers can store, retrieve or transport yarn spindles between warehouses or storage locations. In an automated stereoscopic warehouse, the state of the stacker directly determines whether the automated stereoscopic warehouse can complete the delivery or warehousing operation normally. Therefore, how to accurately predict the state of the stacker becomes a technical problem that needs to be solved urgently.

SUMMARY

The present invention provides a state prediction method and apparatus for a stacker.

According to a first aspect of the present disclosure, provided is a state prediction method for a stacker, including:

- obtaining historical work data and historical maintenance data of the stacker;
- obtaining a work task of the stacker within a preset time period, where the work task is a task pre-assigned by a warehouse management system to the stacker;
- predicting a state of the stacker during execution of the work task based on the historical work data and the historical maintenance data, where the state at least includes time when the stacker fails and a stop position of the stacker when failing;
- simulating the execution of the work task by the stacker within the preset time period based on the historical work data, to obtain a simulation execution result of the stacker; and
- generating a state prediction result of the stacker based on the time when the stacker fails and the stop position of the stacker when failing in combination with the simulation execution result.

According to a second aspect of the present disclosure, provided is a state prediction apparatus for a stacker, including:

- a first obtaining module configured to obtain historical work data and historical maintenance data of the stacker;
- a second obtaining module configured to obtain a work task of the stacker within a preset time period, where the work task is a task pre-assigned by a warehouse management system to the stacker;
- a first prediction module configured to predict a state of the stacker during execution of the work task based on the historical work data and the historical maintenance data, where the state at least includes time when the stacker fails and a stop position of the stacker when failing;
- a simulation module configured to simulate the execution of the work task by the stacker within the preset time period based on the historical work data, to obtain a simulation execution result of the stacker; and
- a first generation module configured to generate a state prediction result of the stacker based on the time when the stacker fails and the stop position of the stacker when failing in combination with the simulation execution result.

According to a third aspect of the present disclosure, provided is an electronic device, including:

- at least one processor; and
- a memory connected in communication with the at least one processor;
- where the memory stores an instruction executable by the at least one processor, and the instruction, when executed by the at least one processor, enables the at least one processor to execute the method of any embodiment of the present disclosure.

According to a fourth aspect of the present disclosure, provided is a non-transitory computer-readable storage medium storing a computer instruction thereon, and the computer instruction is used to cause a computer to execute the method according to any one of the embodiments of the present disclosure.

According to the technology of the present disclosure, the working state of the stacker can be predicted based on the historical work data and historical maintenance data of the stacker, improving the accuracy in predicting the working state of the stacker, helping to improve the delivery and warehousing efficiency of yarn spindles, and thus realizing the automated warehouse management.

It should be understood that the content described in this summary is not intended to limit critical or essential features of embodiments of the present disclosure, nor is it used to limit the scope of the present disclosure. Other features of the present disclosure will be easily understood through the following description.

BRIEF DESCRIPTION OF THE DRAWINGS

The above and other features, advantages and aspects of various embodiments of the present disclosure will become more apparent with reference to the following detailed description in combination with the accompanying drawings. In the accompanying drawings, the same or similar reference numbers represent the same or similar elements.

DETAILED DESCRIPTION

Figure 1:
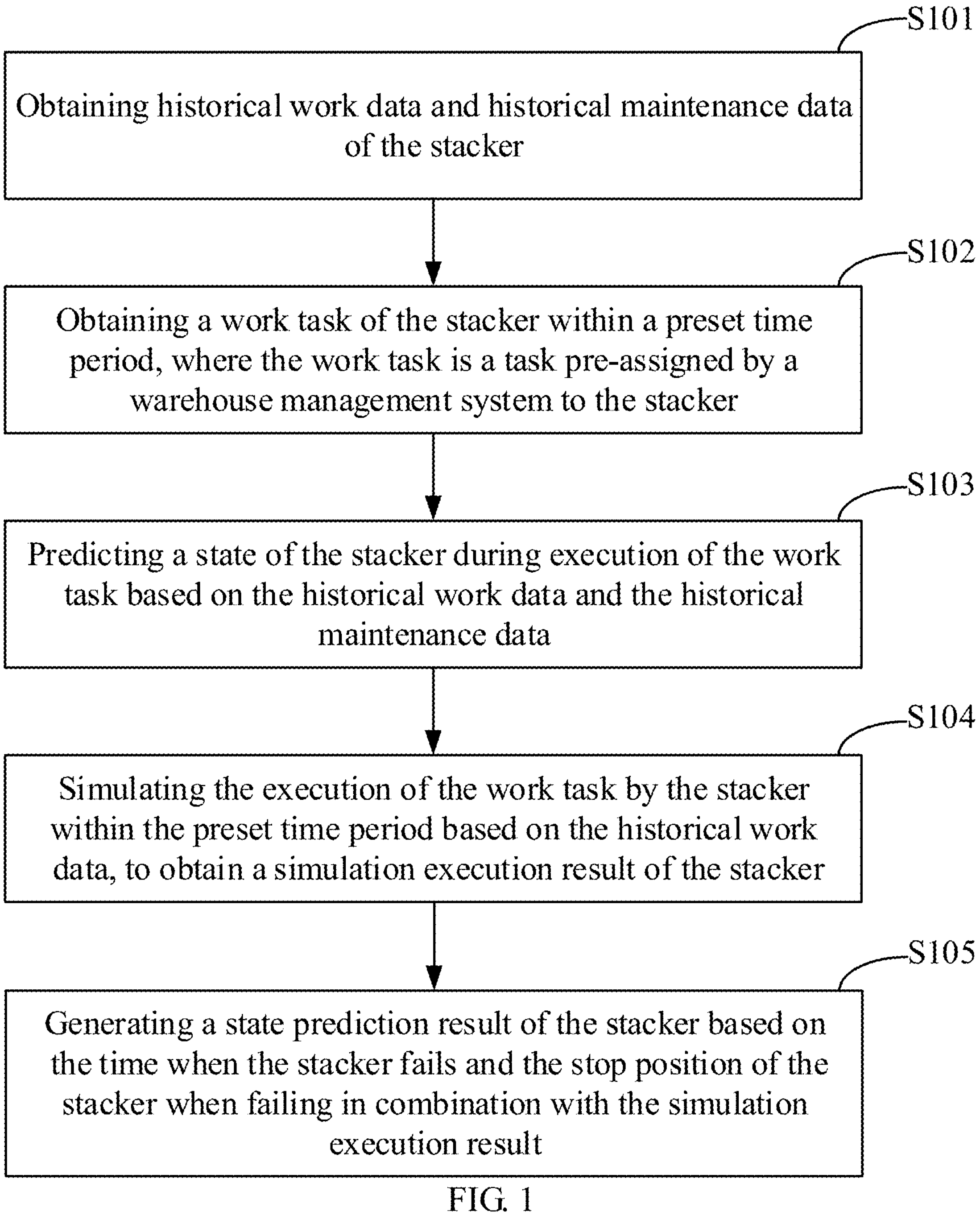
FIG. 1 is a schematic flow chart of a state prediction method for a stacker according to an embodiment of the present disclosure.

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

The terms such as "first", "second" and "third" in the embodiments of the specification, the claims and the above-mentioned drawings in the present disclosure are used to distinguish the similar objects, but not necessarily to describe a particular order or sequence. In addition, the terms "include" and "have" and any variations thereof are intended to cover a non-exclusive inclusion. For example, a method, system, product or device containing a series of steps or units is not necessarily limited to those steps or units listed clearly, but may include other steps or units that are not listed clearly or that are inherent to the process, method, product or device.

Before the technical solutions of the embodiments of the present disclosure are introduced, the technical terms that may be used in the present disclosure are further explained:

Stereoscopic warehouse: also known as pallet warehouse or high-bay warehouse, is a warehouse that uses multiple layers, a dozen of layers or even dozens of layers of shelves to store unit goods, and uses the corresponding material handling equipment to carry out the warehousing and delivery operations of goods. The main body of the stereoscopic warehouse is composed of shelves, aisle stacking cranes, inbound (outbound) workbenches, and an automatic inbound (outbound) and operation control system.

In the related art, the operations of storing the finished yarn spindles in a stereoscopic warehouse, taking the finished yarn spindles out of the warehouse and transferring the yarn spindles from one storage location to another storage location in the stereoscopic warehouse all need to be achieved through stackers. The stacker is a type of storage equipment used to store, retrieve and transport yarn spindles between shelves in a warehouse or storage location.

In the related art, there are a plurality of stereoscopic warehouses for storing the finished yarn spindles, and a plurality of stackers operate in each stereoscopic warehouse. If a stacker fails, the stacker will be unable to perform the current work task, thereby affecting the delivery task of yarn spindles or the efficiency of the delivery task of yarn spindles. Moreover, the stackers operate up and down along routes in the lanes of the stereoscopic warehouse. If a stacker fails, the staff or the warehouse management system cannot accurately determine the working state of the stacker.

In order to at least partially solve one or more of the above problems and other potential problems, the present disclosure proposes a state prediction method and apparatus for a stacker. The working state of the stacker is predicted based on the historical work data and historical maintenance data of the stacker, improving the accuracy in predicting the working state of the stacker, helping to improve the delivery and warehousing efficiency of yarn spindles, and thus realizing the automated warehouse management.

An embodiment of the present disclosure provides a state prediction method for a stacker. FIG. 1 is a schematic flow chart of the state prediction method for the stacker according to an embodiment of the present disclosure. The state prediction method for the stacker can be applied to a state prediction apparatus for a stacker. The state prediction apparatus for the stacker is located on an electronic device. This electronic device includes but is not limited to a fixed device and/or a mobile device. For example, the fixed device includes but is not limited to a server, and the server may be a cloud server or an ordinary server. For example, the mobile device includes but is not limited to a mobile phone, a tablet, etc. In some possible implementations, the state prediction method for the stacker may also be implemented by a processor calling a computer-readable instruction stored in a memory. As shown in FIG. 1, the state prediction method for the stacker includes:

S101: obtaining historical work data and historical maintenance data of the stacker;

S102: obtaining a work task of the stacker within a preset time period, where the work task is a task pre-assigned by a warehouse management system to the stacker;

S103: predicting a state of the stacker during execution of the work task based on the historical work data and the historical maintenance data, where the state at least includes time when the stacker fails and a stop position of the stacker when failing;

S104: simulating the execution of the work task by the stacker within the preset time period based on the historical work data, to obtain a simulation execution result of the stacker; and

S105: generating a state prediction result of the stacker based on the time when the stacker fails and the stop position of the stacker when failing in combination with the simulation execution result.

In an embodiment of the present disclosure, the historical work data is the work data of the stacker over a period of time in the past. The historical work data may include: the number of historical work tasks, the content of historical work tasks, and the time of historical work tasks. The above is only an exemplary description and is not intended to limit all possible contents included in the historical work data, but it is not exhaustive here.

In an embodiment of the present disclosure, the historical maintenance data is the maintenance data of the stacker over a period of time in the past. The historical maintenance data may include: maintenance time, maintenance times, fault type, faulty component, maintenance person, and maintenance tool. The above is only an exemplary description and is not intended to limit all possible contents included in the historical maintenance data, but it is not exhaustive here.

In an embodiment of the present disclosure, the stacker is an important handling equipment in the stereoscopic warehouse, and the stacker can store and retrieve goods automatically, quickly and accurately in the stereoscopic warehouse, improving the utilization rate and operation efficiency of the warehouse. The main components of the stacker may include: a fork configured to pick up, transport and stack goods in a warehouse or workshop; a loading platform configured to place goods; a lifting mechanism configured to realize the lifting and lowering operations of goods; a walking mechanism configured to realize the movement of the stacker in the warehouse; and a control system configured to control various operations and actions of the stacker. Here, the fork may be driven electrically or hydraulically, and may be extended and rotated as needed; the loading platform may be made of steel or aluminum alloy, and has sufficient load-bearing capacity and stability; the lifting mechanism may be driven electrically or hydraulically, and has the characteristics of high precision, good stability and good reliability; the walking mechanism may adopt a wheel or track structure, and has the characteristics of fast moving speed and stable operation; and the control system may adopt control elements such as PLC or single-chip microcomputer, and has the characteristics of high automation and easy operation.

In an embodiment of the present disclosure, the preset time may be 1 day, 3 days, 5 days, etc. Specifically, the preset time may be set and adjusted according to actual needs.

In an embodiment of the present disclosure, the work tasks may include a yarn spindle warehousing task, a yarn spindle delivery task, and a storage location transfer task of yarn spindle. The main types of yarns involved in the solution of the embodiment of the present disclosure may include one or more of Partially Oriented Yarns (POY), Fully Drawn Yarns (FDY), Draw Textured Yarns (DTY) (or called low-elastic yarns), etc. For example, the types of yarns may specifically include Polyester Partially Oriented Yarns, Polyester Fully Drawn Yarns, Polyester Drawn Yarns, Polyester Draw Textured Yarns, Polyester Staple Fiber (PSF), etc.

In an embodiment of the present disclosure, the warehouse management system may issue a warehousing task, a delivery task, and a storage location transfer task of yarn spindle. The Warehouse Management System (WMS) is a system specifically used for warehouse management, focuses on the efficient task execution and process planning strategy, and can greatly improve the operating efficiency and resource utilization in cooperation with the cargo location management, barcode management and warehouse automation equipment.

In some embodiments, the states of the stacker may include: the stacker is in a serious fault state, the stacker is in a minor fault state, the stacker is in a normal state, the stacker is in a sleep state, the stacker is in a shutdown state, and the stacker is in a charging state. The above is only an exemplary description and is not intended to limit all possible types of states of the stacker, but it is not exhaustive here.

In some embodiments, the cases where the stacker is in the serious fault state may include: the stacker cannot be turned on, where this fault may be caused by electrical fault, mechanical fault or other reasons; the stacker makes abnormal noise or vibration, where this fault may be caused by mechanical component damage, bearing wear or other problems; the cargo lifting mechanism, cargo platform or cargo fork of the stacker is damaged, where this fault may cause the stacker to be unable to store and retrieve cargo normally or the stacker to operate unstably; the control panel, display screen or communication device of the stacker fails, where this fault may make it impossible to remotely control or monitor the operating state of the stacker; and the safety device of the stacker is triggered during operation, where this fault may be caused by overload, overdrive or other abnormal conditions of the stacker.

In some embodiments, the cases where the stacker is in the minor fault state may include: a minor fault or error occurs in a sensor of the stacker, where this fault may affect the accuracy and safety of the stacker; a mechanical part of the stacker is slightly worn or loose, where this fault may affect the operating efficiency of the stacker; and a minor error occurs in the control program of the stacker, where this fault may cause the stacker to run less smoothly, thereby affecting the working efficiency of the stacker.

In some embodiments, the state of the stacker may further include: the time when the stacker fails and a stop position of the stacker when failing. The time when the stacker fails can help the maintenance person determine the fault cause of the stacker, and can also help the warehouse management system calculate the progress of the stacker in completing the work task. The stop position of the stacker when failing can help the maintenance person determine whether the fault of the stacker is caused by an external reason, and can also help the warehouse management system calculate the progress of the stacker in completing the work task.

In some embodiments, the warehouse management system can communicate with the stacker. When the warehouse management system communicates with the stacker, the warehouse management system can send a task to be executed and the task data to the stacker; and the stacker can send the task completion state to the warehouse management system. In this way, the intelligence from yarn spindle production to yarn spindle storage can be improved, helping to improve the efficiency of yarn spindle production and yarn spindle delivery/warehousing.

In some embodiments, the simulation execution result is obtained by executing the work task of the stacker within a preset time period based on the historical work data of the stacker. The simulation execution result is the data and analysis result obtained during the simulation process. The simulation execution result can help the maintenance person better understand and grasp the running condition of the stacker, so as to carry out maintenance and control. During the simulation process, it is necessary to set different work parameters and work conditions of the stacker, and record the simulation execution result of each simulation for comparison and analysis. The information about the performance indicator, stability, reliability and other aspects of the stacker can be obtained from the simulation execution result.

In some embodiments, the state prediction result may include: the probability that the stacker can complete the work task normally within the preset time, the probability that the stacker may fail within the preset time, the time when the stacker fails, and the stop position of the stacker when failing. The above is only an exemplary description and is not intended to limit all possible contents included in the state prediction result, but it is not exhaustive here.

The technical solution of the embodiment of the present disclosure is: obtaining historical work data and historical maintenance data of the stacker; obtaining a work task of the stacker within a preset time period, where the work task is a task pre-assigned by a warehouse management system to the stacker; predicting a state of the stacker during execution of the work task based on the historical work data and the historical maintenance data, where the state at least includes time when the stacker fails and a stop position of the stacker when failing; simulating the execution of the work task by the stacker within the preset time period based on the historical work data, to obtain a simulation execution result of the stacker; and generating a state prediction result of the stacker based on the time when the stacker fails and the stop position of the stacker when failing in combination with the simulation execution result. In this way, the working state of the stacker can be predicted based on the historical work data and historical maintenance data of the stacker, improving the accuracy in predicting the working state of the stacker, helping to improve the delivery and warehousing efficiency of yarn spindles, and thus realizing the automated warehouse management.

Figure 2:
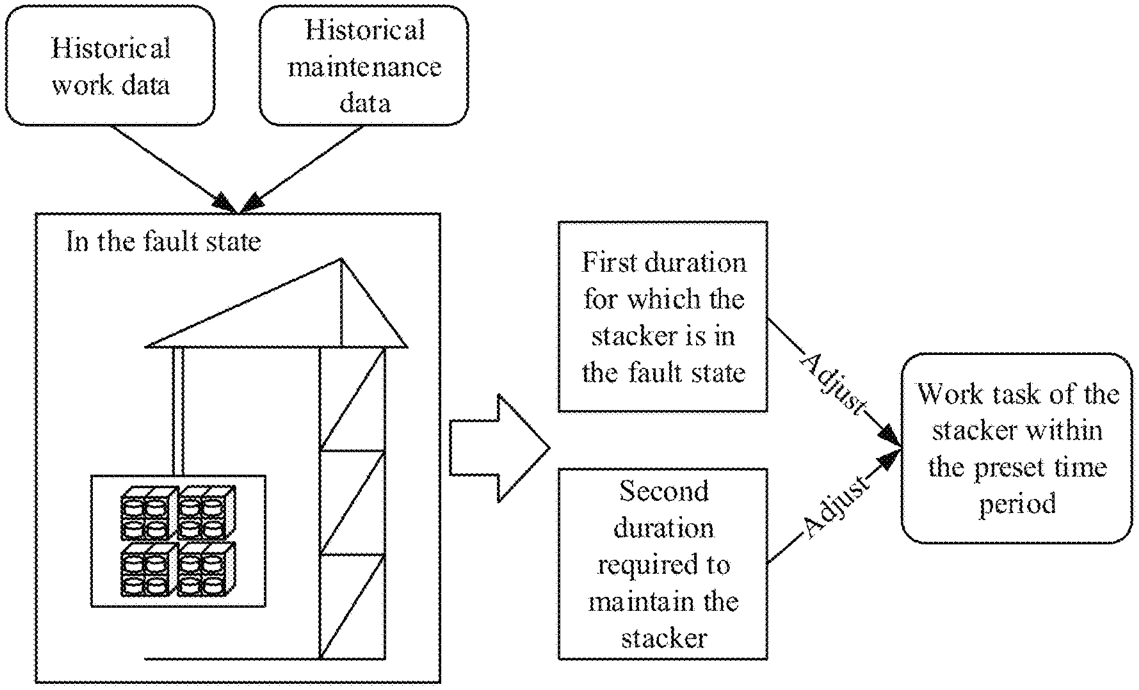
FIG. 2 is a schematic diagram of adjusting the work task of the stacker according to an embodiment of the present disclosure.

FIG. 2 shows a schematic diagram of adjusting the work task of the stacker. As shown in FIG. 2, the state prediction method for the stacker further includes: predicting a first duration for which the stacker is in a fault state when failing and a second duration required to maintain the stacker based on the historical work data and the historical maintenance data; and adjusting the work task of the stacker within the preset time period based on the first duration and the second duration.

In some embodiments, the first duration for which the stacker is in the fault state when failing may be a duration from when the stacker stops running to when the maintenance person starts to perform maintenance. The second duration required to maintain the stacker may be a duration predicted by the maintenance person based on the fault cause of the stacker; or may be a historical maintenance duration based on the fault cause determined by the maintenance person; or may be from the maintenance starting time of the stacker to the maintenance ending time of the stacker.

In some embodiments, the duration taken by the maintenance person to maintain various types of faults of the stacker may be recorded as the second duration required to maintain the stacker. Specifically, the fault types of the stacker are divided into two categories: serious fault and minor fault. The historical maintenance data of the stacker is obtained; the historical maintenance data of the stacker is classified to obtain the serious fault data and minor fault data; and the data analysis is respectively performed on the serious fault data and minor fault data to obtain a fault maintenance schedule. Exemplarily, the fault maintenance schedule may record the serious faults: Serious fault type 1: the stacker cannot be turned on, and the maintenance time is 2 h; Serious fault type 2: the stacker makes abnormal noise or vibration, and the maintenance time is 1.5 h; Serious fault type 3: the cargo lifting mechanism, cargo platform or cargo fork of the stacker is damaged, and the maintenance time is 5 h; Serious fault type 4: the control panel, display screen or communication device of the stacker fails, and the maintenance time is 3 h; and Serious fault type 5: the safety device of the stacker is triggered during operation, and the maintenance time is 1 h. The fault maintenance schedule may record the minor faults: Minor fault type 1: a minor fault or error occurs in a sensor of the stacker, and the maintenance time is 1 h; and Minor fault type 2: a mechanical part of the stacker is slightly worn or loose, and the maintenance time is 0.5 h.

In some embodiments, the warehouse management system issues a delivery task 1 to the stacker A, namely, transporting the POY yarn spindles with batch number A011 from the storage location 207 to the delivery port from 13:00 to 18:00 tomorrow; if it is predicted that the serious fault type 2 may occur in the stacker A tomorrow afternoon based on the historical work data and historical maintenance data of the stacker A, the predicted maintenance duration of stacker A is 1.5 h; and the warehouse management system reissues the task, that is, the stacker B executes the delivery task 1.

In this way, the first duration for which the stacker is in the fault state and the second duration required to maintain the stacker can be predicted based on the historical work data and the historical maintenance data of the stacker; and the work task of the stacker can be adjusted based on the first duration and the second duration, helping to improve the efficiency of the stacker in executing tasks, and avoiding the effect on the efficiency of the warehousing/delivery task of yarn spindles due to the temporary fault of the stacker.

Figure 3:
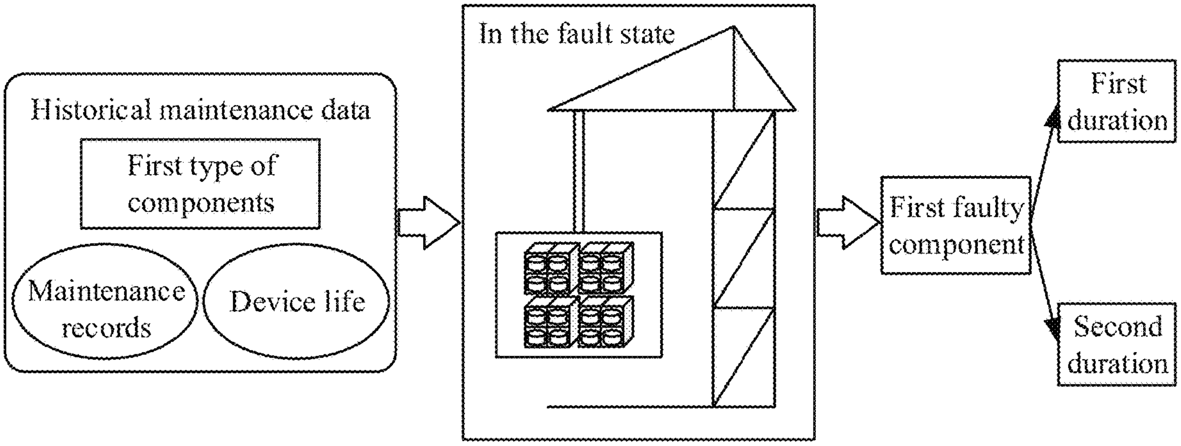
FIG. 3 is a schematic diagram of determining the first duration and the second duration based on the first faulty component according to an embodiment of the present disclosure.

FIG. 3 shows a schematic diagram of determining the first duration and the second duration based on the first faulty component. As shown in FIG. 3, the historical maintenance data includes: maintenance records and component life of a first type of components included in the stacker; where the step of predicting the first duration for which the stacker is in the fault state when failing and the second duration required to maintain the stacker based on the historical work data and the historical maintenance data, includes: determining a first faulty component when the stacker fails based on the maintenance records and the component life of the first type of components; and determining the first duration and the second duration based on the first faulty component when the stacker fails.

In some embodiments, the first type of components may be components replaced when the stacker fails that are recorded in the historical maintenance data. There may be one or more components in the first type.

In some embodiments, the maintenance record of a component in the first type may include: the name of the component in the first type, the replacement time of the component in the first type, the replacement reason of the component in the first type, the model of the component in the first type, and the size of the component in the first type. The above is only an exemplary description and is not intended to limit all possible contents included in the maintenance record of the component in the first type, but it is not exhaustive here.

In some embodiments, the maintenance records of the first type of components may be obtained from the maintenance log of the stacker; or the maintenance records of the first type of components may be obtained by searching from a display screen of the stacker; or the maintenance records of the first type of components may be obtained from a data source of a control device. The above is only an exemplary description and is not intended to limit all possible ways of obtaining the maintenance records of the first type of components, but it is not exhaustive here.

In some embodiments, the component life may refer to the time during which the component can be used normally under the normal use environment and load.

In some embodiments, the way to obtain the component life includes: obtaining the installation time of the component from the maintenance record of the first type of component; obtaining the usage time of the component from the service manual of the component; and obtaining the component life based on the installation time of the component and the usage time of the component.

In some embodiments, the first fault component is a first fault component when determining that the stacker fails according to the maintenance records and component life of the first type of components when the stacker is in the faulty state.

In this way, the first faulty component of the stacker can be determined based on the maintenance records and component life of the first type of components, and the first duration and the second duration can be determined based on the first faulty component when the stacker fails, helping to flexibly adjust the working time of the stacker based on the first duration and the second duration, and thereby helping to improve the efficiency of the stacker in performing the work task.

Figure 4:
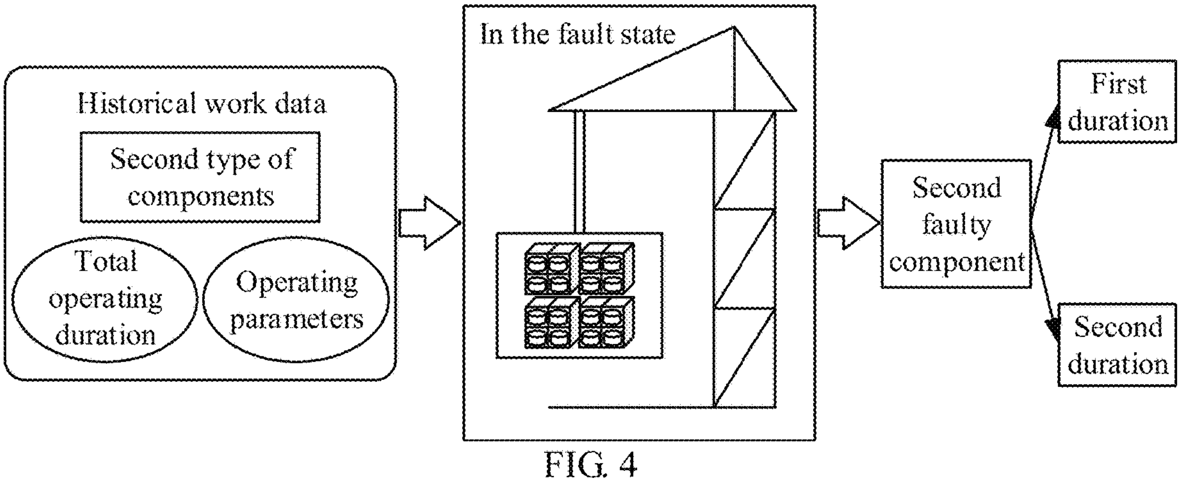
FIG. 4 is a schematic diagram of determining the first duration and the second duration based on the second faulty component according to an embodiment of the present disclosure.

FIG. 4 shows a schematic diagram of determining the first duration and the second duration based on the second faulty component. As shown in FIG. 4, the historical work data includes: total operating duration of a second type of components included in the stacker, and operating parameters of the second type of components when the stacker is working; where the step of predicting the first duration for which the stacker is in the fault state when failing and the second duration required to maintain the stacker based on the historical work data and the historical maintenance data, includes: determining a second faulty component that is in the faulty state when the stacker fails based on the total operating duration and the operating parameters of the second type of components; and determining the first duration and the second duration based on the second faulty component that is in the faulty state when the stacker fails.

In an embodiment of the present disclosure, the total operating duration of the second type of components may be obtained from the work log of the stacker; or the total operating duration of the second type of components may be obtained by searching from the display screen of the stacker; or the total operating duration of the second type of components may be obtained from the data source of the control device. The above is only an exemplary description and is not intended to limit all possible ways of obtaining the total operating duration of the second type of components, but it is not exhaustive here.

In some embodiments, the operating parameters of the second type of components may be obtained from the work log of the stacker; or the operating parameters of the second type of components may be obtained by searching from the display screen of the stacker; or the operating parameters of the second type of components may be obtained from the data source of the control device. The above is only an exemplary description and is not intended to limit all possible ways of obtaining the operating parameters of the second type of components, but it is not exhaustive here.

In some embodiments, the operating parameters of the second type of components may be obtained from a Programmable Logic Controller (PLC) through a Supervisory Control And Data Acquisition (SCADA) system. The SCADA system may display the state of the clicked device in the form of configuration. For example, the SCADA system may directly display the operating parameters of the stacker by clicking on the stacker on the operation interface. The operating parameters of the second type of components (the operating parameters of the stacker) may also be obtained through software supporting the Object Linking and Embedding for Process Control (OPC) protocol.

In some embodiments, the operating parameters of the stacker when working refer to operating state parameters of the component when the stacker is running. For example, if the second type of component is a motor, the operating parameters include a current value, a voltage value, a rotor speed, whether it is overloaded, etc.; if the second type of component is a pressure sensor, the operating parameters include a pressure value; if the second type of component is a temperature sensor, the operating parameters include a temperature value.

In some embodiments, the operating parameters of the stacker when working may include: lifting capacity, which refers to the sum of the maximum weight of materials that the stacker is allowed to fork and the weight of the cargo fork; maximum lifting height, which refers to the vertical distance between the upper surface of the horizontal section of the cargo fork and the ground when the cargo is lifted to the highest position under the rated lifting capacity; maximum lifting speed, which refers to the maximum speed at which the cargo can be lifted under the rated lifting capacity; maximum turning speed, which refers to the maximum speed that the turning platform can reach when turning under the rated lifting capacity; and cargo fork deflection, which refers to the distance the front end of the cargo fork bends when the cargo fork of the stacker rises to the maximum height under the rated lifting capacity.

In some embodiments, the second fault component is a second fault component when determining that the stacker fails according to the total operating duration and operating parameters of the second type of components when the stacker is in the faulty state.

In this way, the second faulty component of the stacker can be determined based on the total operating duration of the second type of components and the operating parameters of the second type of components, and the first duration and the second duration can be determined based on the second faulty component when the stacker fails, helping to flexibly adjust the working time of the stacker based on the first duration and the second duration, and thereby helping to improve the efficiency of the stacker in performing the work task.

In an embodiment of the present disclosure, the state prediction method for the stacker further includes: generating a maintenance task based on the first duration and the second duration, where the maintenance task includes maintenance time, maintenance tool, and maintenance person skill requirement; and sending the maintenance task to a maintenance management center so that the maintenance management center arranges a maintenance person based on the maintenance task.

In an embodiment of the present disclosure, the maintenance task may include maintenance time, maintenance tool, and maintenance person skill requirement. The above is only an exemplary description and is not intended to limit all possible contents included in the maintenance task, but it is not exhaustive here.

In an embodiment of the present disclosure, the maintenance management center is an organization specifically responsible for device maintenance and management, and the responsibilities thereof may include: the maintenance management center is responsible for formulating the device maintenance plans, including daily maintenance, regular inspection and trouble shooting of devices, etc.; the maintenance management center is responsible for diagnosing and repairing the device faults, to ensure the normal operations of devices; the maintenance management center is responsible for the daily safety management of devices, including safety inspections of devices, correction of safety issues, etc.; the maintenance management center is responsible for managing the spare parts of devices, to ensure the sufficiency and effective use of the spare parts; the maintenance management center is responsible for recording the maintenance records and reports of devices, including fault conditions, maintenance processes and maintenance results of devices, etc.; the maintenance management center is responsible for training and managing the maintenance persons, to improve the skills and work efficiency of the maintenance persons; and the maintenance management center is responsible for improving and optimizing devices, to increase the performance and efficiency of devices, and assist other departments in completing some tasks, for example, assist the production department in increasing the production efficiency, assist the quality department in increasing the product quality, etc.

In this way, the maintenance person and maintenance time can be arranged in time for the faulty stacker based on the maintenance task, helping to improve the efficiency of fault maintenance for the stacker, thereby improving the working efficiency of the stacker, and improving the efficiency of the delivery and warehousing efficiency of yarn spindles.

In an embodiment of the present disclosure, the state prediction method for the stacker further includes: determining a first target task and a second target task in the work task based on the time when the stacker fails and the stop position of the stacker when failing, where the first target task is a task in the work task that the stacker can complete within the preset time period, and the second target task is a task in the work task that the stacker cannot complete within the preset time period; and sending the second target task within the preset time period to another stacker, so that the another stacker executes the second target task.

Here, the preset time period is a time period in which the stacker is designated to execute the warehousing task or delivery task of yarn spindles.

In some embodiments, the first target task is a task that the stacker can normally complete when the stacker is in the fault state. Exemplarily, the stacker A is executing the delivery tasks for the storage location 120 and storage location 130. If the lifting mechanism of the stacker A fails when executing the delivery task for the storage location 120, the first target task is the delivery task for the storage location 120.

In some embodiments, the second target task is a task that the stacker cannot normally complete when the stacker is in the fault state. Exemplarily, the stacker A is executing the delivery tasks for the storage location 120 and storage location 130. If the lifting mechanism of the stacker A fails when executing the delivery task for the storage location 120, the second target task is the delivery task for the storage location 130. The warehouse management system sends the second target task to the stacker B, so that the stacker B executes the second target task.

In this way, when the stacker is in the faulty state, only the first target task that can be completed normally can be completed, and the second target task that cannot be completed normally can be sent to another stacker, helping to improve the working efficiency of the stacker.

In an embodiment of the present disclosure, the step of predicting the state of the stacker during execution of the work task based on the historical work data and the historical maintenance data, includes: inputting the historical work data and the historical maintenance data into a state prediction model; and obtaining the state of the stacker output by the state prediction model.

In some embodiments, the states of the stacker may include: the stacker is in a fault state, the stacker is in a normal state, the stacker is in a sleep state, the stacker is in a shutdown state, the stacker is in a charging state, and the stacker is in a maintenance state.

In this way, the state of the stacker output by the state prediction model is obtained by inputting the historical work data and historical maintenance data into the state prediction model, helping to predict the working state of the stacker in advance, and thereby improving the delivery and warehousing efficiency of yarn spindles.

In an embodiment of the present disclosure, the state prediction model is trained by: obtaining historical work sample data and historical maintenance sample data of the stacker; inputting the historical work sample data and the historical maintenance sample data into a preset model; obtaining a predicted value of the state of the stacker output by the preset model; constructing a loss function based on a true value of the state of the stacker and the predicted value of the state of the stacker; and training the preset model based on the loss function, to obtain the state prediction model.

In some embodiments, the historical work sample data and the historical maintenance sample data of the stacker may be obtained from the data source of the control device; or may be obtained from a working log and a maintenance log of the stacker. The above is only an exemplary description and is not intended to limit all possible ways of obtaining the historical work sample data and the historical maintenance sample data of the stacker, but it is not exhaustive here.

In this way, the historical work sample data and historical maintenance sample data of the stacker are obtained; the historical work sample data and the historical maintenance sample data are input into the preset model; the predicted value of the state of the stacker output by the preset model is obtained; the loss function is constructed based on the true value and the predicted value of the state of the stacker; and the preset model is trained based on the loss function, to obtain the state prediction model. The state of the stacker can be predicted in advance based on the trained state prediction model, thereby helping to improve the accuracy in predicting the working state of the stacker.

It should be understood that FIGS. 2 to 4 are only illustrative and not restrictive, and the contents in the figures can be adaptively adjusted or changed according to operational requirements, which will not be described again here. Those skilled in the art can make various obvious changes and/or replacements based on the examples of FIGS. 2 to 4, and the obtained technical solutions still belong to the disclosure scope of the embodiments of the present disclosure.

Figure 5:
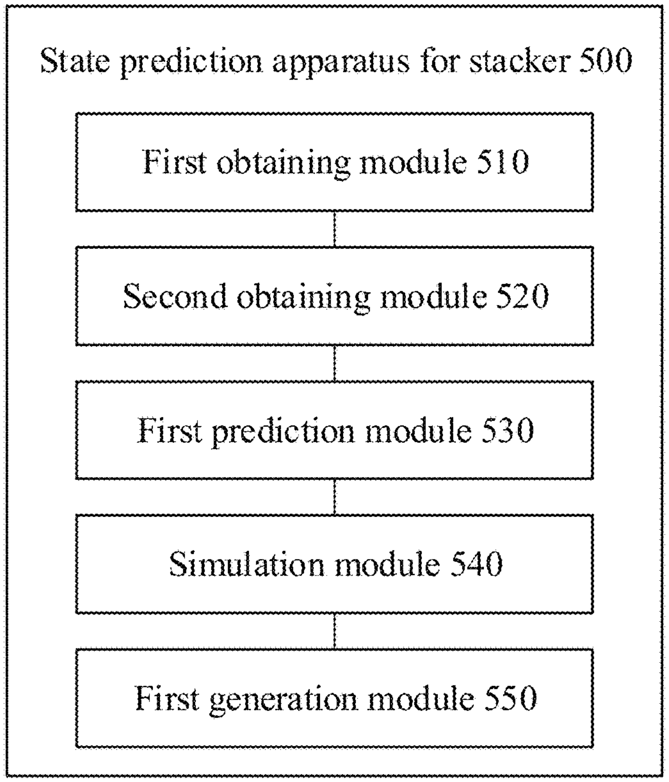
FIG. 5 is a schematic structural diagram of a state prediction apparatus for a stacker according to an embodiment of the present disclosure.

The present disclosure provides a state prediction apparatus for a stacker. As shown in FIG. 5, the state prediction apparatus for the stacker may include:

- a first obtaining module 510 configured to obtain historical work data and historical maintenance data of the stacker;
- a second obtaining module 520 configured to obtain a work task of the stacker within a preset time period, where the work task is a task pre-assigned by a warehouse management system to the stacker;
- a first prediction module 530 configured to predict a state of the stacker during execution of the work task based on the historical work data and the historical maintenance data, where the state at least includes time when the stacker fails and a stop position of the stacker when failing;
- a simulation module 540 configured to simulate the execution of the work task by the stacker within the preset time period based on the historical work data, to obtain a simulation execution result of the stacker; and
- a first generation module 550 configured to generate a state prediction result of the stacker based on the time when the stacker fails and the stop position of the stacker when failing in combination with the simulation execution result.

In some embodiments, the state prediction apparatus for the stacker further includes: a second prediction module (not shown in FIG. 5) configured to predict a first duration for which the stacker is in a fault state when failing and a second duration required to maintain the stacker based on the historical work data and the historical maintenance data; and an adjustment module (not shown in FIG. 5) configured to adjust the work task of the stacker within the preset time period based on the first duration and the second duration.

In some embodiments, the historical maintenance data includes: maintenance records and component life of a first type of components included in the stacker; where the second prediction module (not shown in FIG. 5) includes: a first determining submodule configured to determine a first faulty component when the stacker fails based on the maintenance records and the component life of the first type of components; and a second determining submodule configured to determine the first duration and the second duration based on the first faulty component when the stacker fails.

In some embodiments, the historical work data includes: total operating duration of a second type of components included in the stacker, and operating parameters of the second type of components when the stacker is working; where the second prediction module (not shown in FIG. 5) includes: a third determining submodule configured to determine a second faulty component that is in the faulty state when the stacker fails based on the total operating duration and the operating parameters of the second type of components; and a fourth determining submodule configured to determine the first duration and the second duration based on the second faulty component that is in the faulty state when the stacker fails.

In some embodiments, the state prediction apparatus for the stacker further includes: a second generation module (not shown in FIG. 5) configured to generate a maintenance task based on the first duration and the second duration, where the maintenance task includes maintenance time, maintenance tool, and maintenance person skill requirement; and a first sending module (not shown in FIG. 5) configured to send the maintenance task to a maintenance management center so that the maintenance management center arranges a maintenance person based on the maintenance task.

In some embodiments, the state prediction apparatus for the stacker further includes: a determining module (not shown in FIG. 5) configured to determine a first target task and a second target task in the work task based on the time when the stacker fails and the stop position of the stacker when failing, where the first target task is a task in the work task that the stacker can complete within the preset time period, and the second target task is a task in the work task that the stacker cannot complete within the preset time period; and a second sending module (not shown in FIG. 5) configured to send the second target task within the preset time period to another stacker, so that the another stacker executes the second target task.

In some embodiments, the first prediction module 530 includes: an input submodule configured to input the historical work data and the historical maintenance data into a state prediction model; and an obtaining submodule configured to obtain the state of the stacker output by the state prediction model.

In some embodiments, the state prediction model is trained by: obtaining historical work sample data and historical maintenance sample data of the stacker; inputting the historical work sample data and the historical maintenance sample data into a preset model; obtaining a predicted value of the state of the stacker output by the preset model; constructing a loss function based on a true value of the state of the stacker and the predicted value of the state of the stacker; and training the preset model based on the loss function, to obtain the state prediction model.

Those skilled in the art should understand that the functions of the processing modules in the state prediction apparatus for the stacker in the embodiments of the present disclosure can be understood with reference to the relevant description of the state prediction method for the stacker described above, and the processing modules in the state prediction apparatus for the stacker in the embodiments of the present disclosure may be implemented by an analog circuit that implements the functions in the embodiments of the present disclosure or may be implemented by running software that performs the functions in the embodiments of the present disclosure on an electronic device.

The state prediction apparatus for the stacker in the embodiments of the present disclosure can predict the working state of the stacker based on the historical work data and historical maintenance data of the stacker, improving the accuracy in predicting the working state of the stacker, thereby improving the delivery and warehousing efficiency of yarn spindles, and realizing the automated warehouse management.

According to embodiments of the present disclosure, the present disclosure also provides an electronic device and a readable storage medium.

Figure 6:
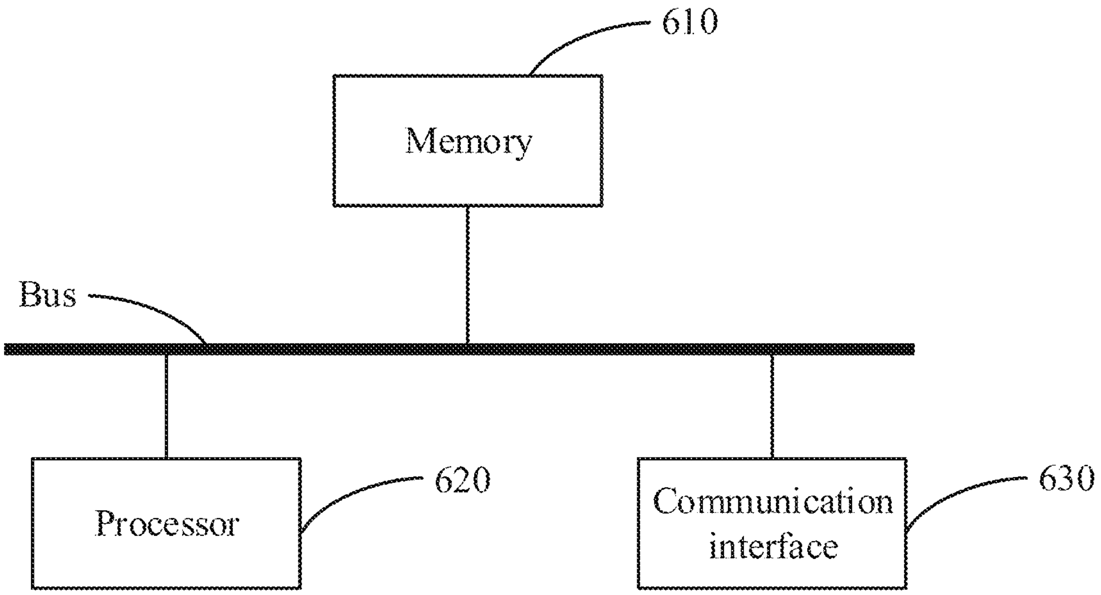
FIG. 6 is a block diagram of an electronic device used to implement the state prediction method for the stacker according to an embodiment of the present disclosure.

FIG. 6 is a structural block diagram of an electronic device according to an embodiment of the present disclosure. As shown in FIG. 6, the electronic device includes: a memory 610 and a processor 620, and the memory 610 stores a computer program that can run on the processor 620. There may be one or more memories 610 and processors 620. The memory 610 may store one or more computer programs, and the one or more computer programs cause the electronic device to perform the method provided in the above method embodiment, when executed by the electronic device. The electronic device may also include: a communication interface 630 configured to communicate with an external device for data interactive transmission.

If the memory 610, the processor 620 and the communication interface 630 are implemented independently, the memory 610, the processor 620 and the communication interface 630 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 6, but this thick line does not represent only one bus or only one type of bus.

Optionally, in a specific implementation, if the memory 610, the processor 620 and the communication interface 630 are integrated on one chip, the memory 610, the processor 620 and the communication interface 630 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

In the description of this specification, it should be understood that the orientations or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axis"", "radial", "circumferential", etc. are orientations or position relationships shown based on the drawings, and are only for the purpose of facilitating the description of the present disclosure and simplifying the description, rather than indicating or implying that the device or element referred to must have a particular orientation or be constructed and operated in a particular orientation, and thus should not be construed as the limitation on the present disclosure.

What is claimed is:

1. A state prediction method for a stacker, applied to a state prediction apparatus located on an electronic device, the method comprising:

obtaining historical work data and historical maintenance data of the stacker, wherein the historical work data comprises a number of historical work tasks, content of the historical work tasks, and time of the historical work tasks, and the historical maintenance data comprises maintenance records and component life of a first type of components comprised in the stacker;

obtaining a work task of the stacker within a preset time period, wherein the work task is a task pre-assigned by a warehouse management system to the stacker;

predicting a state of the stacker during execution of the work task based on the historical work data and the historical maintenance data, by;

inputting the historical work data and the historical maintenance data into a state prediction model, wherein the state prediction model is trained by:

obtaining historical work sample data and historical maintenance sample data of the stacker;

inputting the historical work sample data and the historical maintenance sample data into a preset model;

obtaining a predicted value of the state of the stacker output by the preset model;

constructing a loss function based on a true value of the state of the stacker and the predicted value of the state of the stacker; and training the preset model based on the loss function, to obtain the state prediction model; and obtaining the state of the stacker output by the state prediction model; wherein the state at least comprises time when the stacker fails and a stop position of the stacker when failing;

simulating the execution of the work task by the stacker within the preset time period based on the historical work data, to obtain a simulation execution result of the stacker;

generating a state prediction result of the stacker based on the time when the stacker fails and the stop position of the stacker when failing in combination with the simulation execution result, wherein the state prediction result comprises: a probability that the stacker is able to complete the work task normally within the preset time period, a probability that the stacker fails within the preset time period, the time when the stacker fails, and the stop position of the stacker when failing;

predicting a first duration for which the stacker is in a fault state when failing and a second duration required to maintain the stacker based on the historical work data and the historical maintenance data, comprising:

determining a first faulty component when the stacker fails based on the maintenance records and the component life of the first type of components; and determining the first duration and the second duration based on the first faulty component when the stacker fails; and adjusting the work task of the stacker within the preset time period based on the first duration and the second duration.

2. The method of claim 1, wherein the historical work data comprises: total operating duration of a second type of components comprised in the stacker, and operating parameters of the second type of components when the stacker is working;

wherein predicting the first duration for which the stacker is in the fault state when failing and the second duration required to maintain the stacker based on the historical work data and the historical maintenance data, comprises:

determining a second faulty component that is in the faulty state when the stacker fails based on the total operating duration and the operating parameters of the second type of components; and determining the first duration and the second duration based on the second faulty component that is in the faulty state when the stacker fails.

3. The method of claim 1, further comprising:

generating a maintenance task based on the first duration and the second duration, wherein the maintenance task comprises maintenance time, maintenance tool, and maintenance person skill requirement; and sending the maintenance task to a maintenance management center so that the maintenance management center arranges a maintenance person based on the maintenance task.

4. The method of claim 1, further comprising:

determining a first target task and a second target task in the work task based on the time when the stacker fails and the stop position of the stacker when failing, wherein the first target task is a task in the work task that the stacker can complete within the preset time period, and the second target task is a task in the work task that the stacker cannot complete within the preset time period; and sending the second target task within the preset time period to another stacker, so that the another stacker executes the second target task.

5. The method of claim 1, wherein the state prediction model is trained by:

obtaining historical work sample data and historical maintenance sample data of the stacker;

inputting the historical work sample data and the historical maintenance sample data into a preset model;

obtaining a predicted value of the state of the stacker output by the preset model;

constructing a loss function based on a true value of the state of the stacker and the predicted value of the state of the stacker; and training the preset model based on the loss function, to obtain the state prediction model.

6. An electronic device, comprising:

at least one processor; and a memory connected in communication with the at least one processor;

wherein the memory stores an instruction executable by the at least one processor, and the instruction, when executed by the at least one processor, enables the at least one processor to execute following operations:

obtaining historical work data and historical maintenance data of the stacker, wherein the historical work data comprises a number of historical work tasks, content of the historical work tasks, and time of the historical work tasks, and the historical maintenance data comprises maintenance records and component life of a first type of components comprised in the stacker;

obtaining a work task of the stacker within a preset time period, wherein the work task is a task pre-assigned by a warehouse management system to the stacker;

predicting a state of the stacker during execution of the work task based on the historical work data and the historical maintenance data, by:

inputting the historical work data and the historical maintenance data into a state prediction model, wherein the state prediction model is trained by:

obtaining historical work sample data and historical maintenance sample data of the stacker;

inputting the historical work sample data and the historical maintenance sample data into a preset model;

obtaining a predicted value of the state of the stacker output by the preset model;

constructing a loss function based on a true value of the state of the stacker and the predicted value of the state of the stacker; and training the preset model based on the loss function, to obtain the state prediction model; and obtaining the state of the stacker output by the state prediction model; wherein the state at least comprises time when the stacker fails and a stop position of the stacker when failing;

simulating the execution of the work task by the stacker within the preset time period based on the historical work data, to obtain a simulation execution result of the stacker;

generating a state prediction result of the stacker based on the time when the stacker fails and the stop position of the stacker when failing in combination with the simulation execution result, wherein the state prediction result comprises: a probability that the stacker is able to complete the work task normally within the preset time period, a probability that the stacker fails within the preset time period, the time when the stacker fails, and the stop position of the stacker when failing;

predicting a first duration for which the stacker is in a fault state when failing and a second duration required to maintain the stacker based on the historical work data and the historical maintenance data, comprising:

determining a first faulty component when the stacker fails based on the maintenance records and the component life of the first type of components; and determining the first duration and the second duration based on the first faulty component when the stacker fails; and adjusting the work task of the stacker within the preset time period based on the first duration and the second duration.

7. The electronic device of claim 6, wherein the state prediction model is trained by:

obtaining historical work sample data and historical maintenance sample data of the stacker;

inputting the historical work sample data and the historical maintenance sample data into a preset model;

obtaining a predicted value of the state of the stacker output by the preset model;

constructing a loss function based on a true value of the state of the stacker and the predicted value of the state of the stacker; and training the preset model based on the loss function, to obtain the state prediction model.

8. The electronic device of claim 6, wherein the historical work data comprises: total operating duration of a second type of components comprised in the stacker, and operating parameters of the second type of components when the stacker is working;

wherein predicting the first duration for which the stacker is in the fault state when failing and the second duration required to maintain the stacker based on the historical work data and the historical maintenance data, comprises:

determining a second faulty component that is in the faulty state when the stacker fails based on the total operating duration and the operating parameters of the second type of components; and determining the first duration and the second duration based on the second faulty component that is in the faulty state when the stacker fails.

9. The electronic device of claim 6, wherein the operations further comprise:

generating a maintenance task based on the first duration and the second duration, wherein the maintenance task comprises maintenance time, maintenance tool, and maintenance person skill requirement; and sending the maintenance task to a maintenance management center so that the maintenance management center arranges a maintenance person based on the maintenance task.

10. The electronic device of claim 6, wherein the operations further comprise:

determining a first target task and a second target task in the work task based on the time when the stacker fails and the stop position of the stacker when failing, wherein the first target taskis a task in the work task that the stacker can complete within the preset time period, and the second target task is a task in the work task that the stacker cannot complete within the preset time period; and sending the second target task within the preset time period to another stacker, so that the another stacker executes the second target task.

11. A non-transitory computer-readable storage medium storing a computer instruction thereon, wherein the computer instruction is used to cause a computer to execute following operations:

obtaining historical work data and historical maintenance data of the stacker, wherein the historical work data comprises a number of historical work tasks, content of the historical work tasks, and time of the historical work tasks, and the historical maintenance data comprises maintenance records and component life of a first type of components comprised in the stacker;

obtaining a work task of the stacker within a preset time period, wherein the work task is a task pre-assigned by a warehouse management system to the stacker;

predicting a state of the stacker during execution of the work task based on the historical work data and the historical maintenance data, by:

inputting the historical work data and the historical maintenance data into a state prediction model, wherein the state prediction model is trained by:

obtaining historical work sample data and historical maintenance sample data of the stacker;

inputting the historical work sample data and the historical maintenance sample data into a preset model;

obtaining a predicted value of the state of the stacker output by the preset model;

inputting the historical work sample data and the historical maintenance sample data into a preset model;

obtaining a predicted value of the state of the stacker output by the preset model;

constructing a loss function based on a true value of the state of the stacker and the predicted value of the state of the stacker; and training the preset model based on the loss function, to obtain the state prediction model; and obtaining the state of the stacker output by the state prediction model; wherein the state at least comprises time when the stacker fails and a stop position of the stacker when failing;

simulating the execution of the work task by the stacker within the preset time period based on the historical work data, to obtain a simulation execution result of the stacker;

generating a state prediction result of the stacker based on the time when the stacker fails and the stop position of the stacker when failing in combination with the simulation execution result, wherein the state prediction result comprises: a probability that the stacker is able to complete the work task normally within the preset time period, a probability that the stacker fails within the preset time period, the time when the stacker fails, and the stop position of the stacker when failing;

predicting a first duration for which the stacker is in a fault state when failing and a second duration required to maintain the stacker based on the historical work data and the historical maintenance data, comprising:

determining a first faulty component when the stacker fails based on the maintenance records and the component life of the first type of components; and determining the first duration and the second duration based on the first faulty component when the stacker fails; and adjusting the work task of the stacker within the preset time period based on the first duration and the second duration.

12. The non-transitory computer-readable storage medium of claim 11, wherein the historical work data comprises: total operating duration of a second type of components comprised in the stacker, and operating parameters of the second type of components when the stacker is working;

wherein predicting the first duration for which the stacker is in the fault state when failing and the second duration required to maintain the stacker based on the historical work data and the historical maintenance data, comprises:

determining a second faulty component that is in the faulty state when the stacker fails based on the total operating duration and the operating parameters of the second type of components; and determining the first duration and the second duration based on the second faulty component that is in the faulty state when the stacker fails.

13. The non-transitory computer-readable storage medium of claim 11, wherein the operations further comprise:

generating a maintenance task based on the first duration and the second duration, wherein the maintenance task comprises maintenance time, maintenance tool, and maintenance person skill requirement; and sending the maintenance task to a maintenance management center so that the maintenance management center arranges a maintenance person based on the maintenance task.

14. The non-transitory computer-readable storage medium of claim 11, wherein the operations further comprise:

determining a first target task and a second target task in the work task based on the time when the stacker fails and the stop position of the stacker when failing, wherein the first target task is a task in the work task that the stacker can complete within the preset time period, and the second target task is a task in the work task that the stacker cannot complete within the preset time period; and sending the second target task within the preset time period to another stacker, so that the another stacker executes the second target task.

15. The non-transitory computer-readable storage medium of claim 11, wherein the state prediction model is trained by:

obtaining historical work sample data and historical maintenance sample data of the stacker;

inputting the historical work sample data and the historical maintenance sample data into a preset model;

obtaining a predicted value of the state of the stacker output by the preset model;

constructing a loss function based on a true value of the state of the stacker and the predicted value of the state of the stacker; and training the preset model based on the loss function, to obtain the state prediction model.

* * * * *